Figure 1:
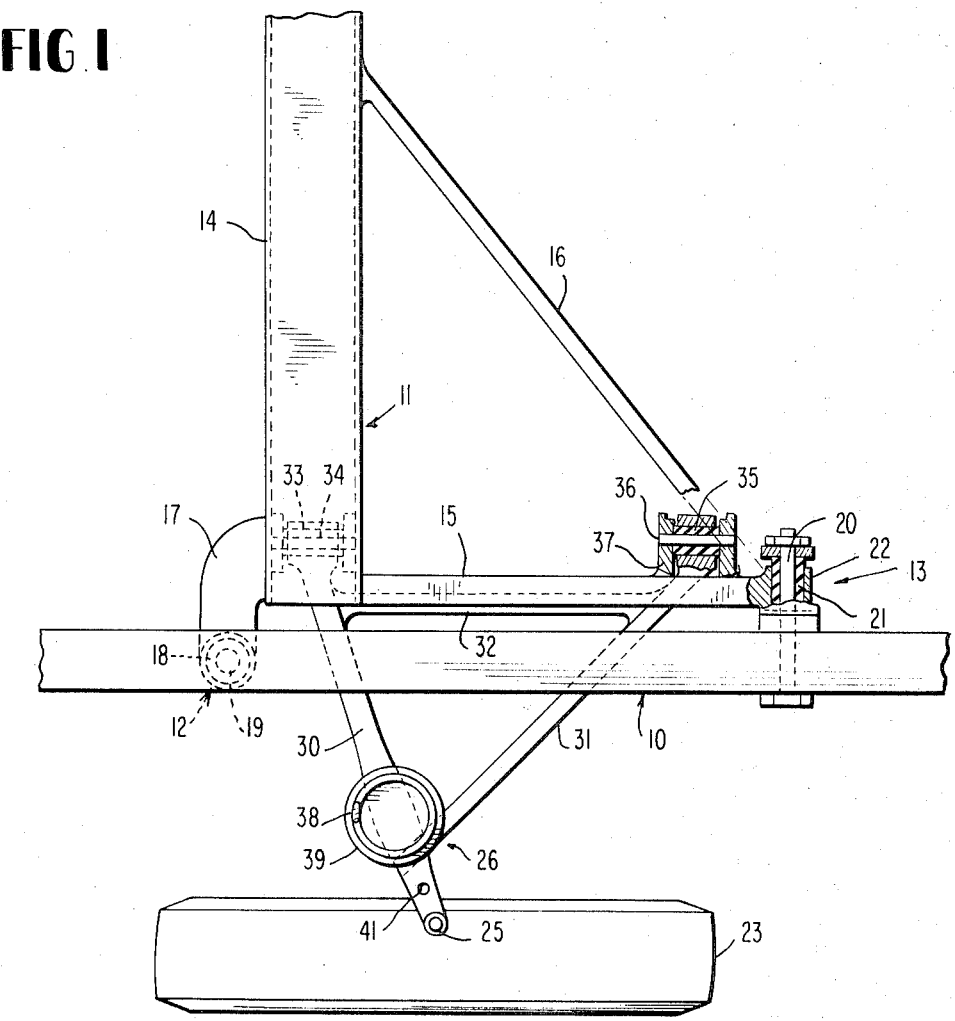

United States Patent [19]
Uhlenhaut et al.

[11] 3,831,967
[45] Aug. 27, 1974

[54] WHEEL SUSPENSION FOR VEHICLES

[75] Inventors: Rudolf Uhlenhaut, Stuttgart; Alfred Rothweiler, Esslingen-Hegensberg; Erich Waxenberger, Neuhausen, all of Germany

[73] Assignee: Daimler-Benz Aktiengesellschaft, Stuttgart, Germany

[22] Filed: Oct. 24, 1972

[21] Appl. No.: 300,261

[30] Foreign Application Priority Data
Oct. 23, 1971 Germany.............................. 2152962

[52] U.S. Cl........ 280/124 A, 280/96.2 R, 267/20 A
[51] Int. Cl.............................................. B60g 3/10
[58] Field of Search....... 280/124 R, 124 A, 96.2 R, 280/106.5 R; 267/20 A, 21 A

[56] References Cited
UNITED STATES PATENTS

| | | | |
|---|---|---|---|
| 2,695,168 | 11/1954 | Westra............................ | 280/96.2 R |
| 2,939,720 | 6/1960 | Wroby........................ | 280/106.5 R |
| 3,493,065 | 2/1970 | Burnham........................ | 280/124 R |
| 3,694,000 | 9/1972 | Van Winson ................... | 280/124 R |

*Primary Examiner*—Philip Goodman
*Assistant Examiner*—John A. Carroll
*Attorney, Agent, or Firm*—Craig & Antonelli

[57] ABSTRACT

A wheel suspension for vehicles, especially for motor vehicles, in which each wheel of two wheels of a wheel pair disposed opposite one another are elastically supported at the vehicle superstructure by means of two superposed guide members or by means of one guide member and at least one further guide element with the use of a cross bearer member, itself elastically supported at the vehicle superstructure; only those guide members of the two wheels of the wheel pair of wheels, which are loaded by the vehicle spring system are thereby elastically supported on the cross bearer member independently of the other guide members which are then supported directly at the vehicle superstructure.

41 Claims, 2 Drawing Figures

PATENTED AUG 27 1974 3,831,967

WHEEL SUSPENSION FOR VEHICLES

The present invention relates to a wheel suspension for vehicles, especially for motor vehicles, in which each wheel of two mutually oppositely disposed wheels of a wheel pair are elastically suspended at the vehicle superstructure by means of two superposed guide members or by means of one guide member and at least one further guide element with the use of a cross bearer which is elastically supported at the vehicle superstructure.

It has been discovered that with prior art constructions of this type, in which both guide members or guide elements are suspended at the cross bearer or an auxiliary frame, a so-called "drive stool," there exists under certain circumstances a tendency to shock-like, intermittent vibrations or oscillations.

The present invention is concerned with the task to provide a wheel suspension of the aforementioned type in which the tendency toward the aforementioned high frequency vibrations or oscillations (noises and shocks) are far-reachingly avoided and, on the other, a relatively simple type of construction is made possible. Accordingly, the present invention essentially resides in that only the guide members of the two wheels of the wheel pair, which are loaded by the vehicle spring system, are elastically supported as a whole on the cross bearer member common to both wheels, independently of the respective other guide member or guide element directly supported at the vehicle superstructure.

As a result of the elastic suspension of the guide member principally loaded or stressed by the spring forces at the elastically supported cross bearer member, separate from the remaining wheel suspension, above all the high frequency oscillations and vibrations at the cross bearer member cannot be transmitted undisturbed onto the entire wheel suspension and the vehicle superstructure. On the other hand, an effective insulation against the transmission of shocks and noises is assured by the double elasticity interposed between guide members and vehicle superstructure. At the same time, a simple type of construction results since the bearing support of the second guide member or of the corresponding guide element at the cross bearer member is obviated.

Preferably also the wheel spring system is supported at its end on the side of the body, directly at the vehicle superstructure in by-passing relationship to the cross bearer member. The cross bearer member can thereby be constructed and dimensioned so as to be relatively light weight.

According to a further feature of the present invention, the cross bearer member is constructed U-shaped as a rigid, sturdy bearer with leg portions extending essentially in the vehicle longitudinal direction whereby the guide members of the mutually oppositely disposed wheels which are supported at the cross bearer member and are constructed triangularly shaped or similarly constructed, are elastically supported with their two guide arms each within the area of the beginning of the leg portion (i.e., approximately at the transition place between the leg portion and the cross web of the cross bearer member) on the one hand, and of the end of the leg portion of the cross bearer member, on the other. Preferably, also the rigidly constructed cross bearer member is correspondingly elastically supported at the vehicle superstructure.

Accordingly, it is an object of the present invention to provide a wheel suspension for vehicles, especially motor vehicles which avoids by simple means the aforementioned shortcomings and drawbacks encountered in the prior art.

Another object of the present invention resides in a wheel suspension for vehicles, especially motor vehicles which minimizes the tendency to shock-like vibrations and oscillations in the suspension.

A further object of the present invention resides in a wheel suspension for vehicles, especially motor vehicles, which permits a reduction in structural expenditures while enabling a relatively simple construction.

Another object of the present invention resides in a wheel suspension of the type described above in which an effective insulation is assured against the transmission of shocks and vibrations.

A still further object of the present invention resides in a wheel suspension of the type described above which also permits the use of a cross bearer member which can be designed as a relatively light structural member without impairing the proper functioning of the suspension.

Figure 2:
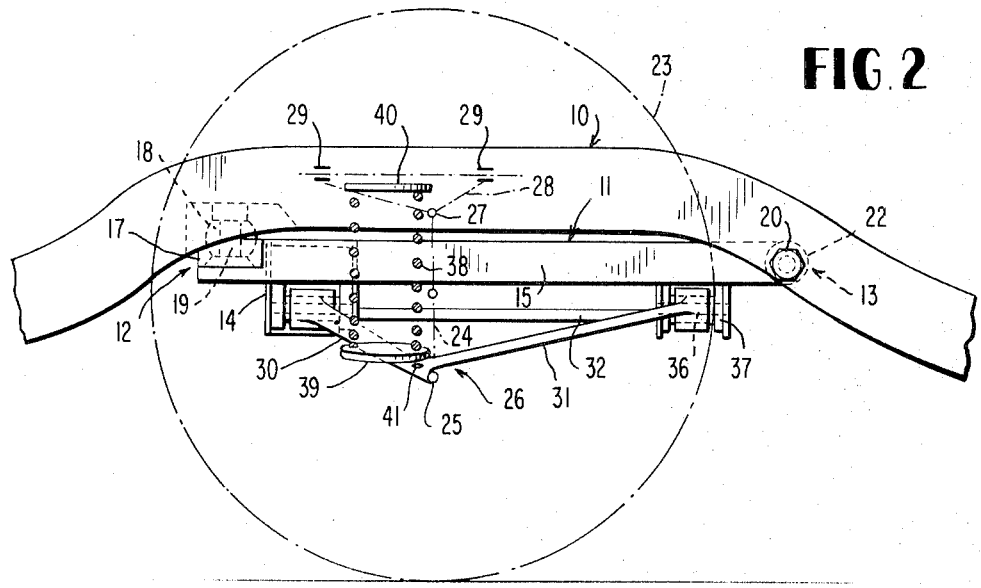

These and other objects, features and advantages of the present invention will become more apparent from the following description when taken in connection with the accompanying drawing which shows, for purposes of illustration only, one embodiment in accordance with the present invention, and wherein:

FIG. 1 is a partial plan view of a wheel suspension in accordance with the present invention partly in cross section; and FIG. 2 is a partial, somewhat schematic side elevational view of the suspension of FIG. 1.

Referring now to the drawing wherein like reference numerals are used throughout the two views to designate like parts, reference numeral 11 generally designates in both figures the cross bearer member which is elastically supported at the vehicle superstructure on each vehicle side in two bearing supports generally designated by reference numerals 12 and 13 and more particularly in the illustrated embodiment at the two lateral frame longitudinal bearers generally designated by reference numeral 10 (of which only one longitudinal bearer is shown in the drawing). The term "vehicle superstructure" is used in this application to refer to the support structure of the vehicle such as conventional frame structures as well as body support constructions, particularly self-supporting-type body constructions. The cross bearer member 11 (shown only as to one-half of its length since the other half is symmetrical) is constructed essentially U-shaped as rigid bearer with a web 14 and two lateral legs 15 extending in the longitudinal direction of the vehicle. One brace 16 extending obliquely to the driving direction reinforces the transversely disposed web 11 with the end of one of the two legs 15 of the cross bearer member 11.

One arm 17 each which is arranged within the area of the connection of the web 14 and the corresponding leg portion 15, serves for the forward support of the cross bearer member 11 at the corresponding one of the two longitudinal frame bearers 10; the arm 17 is universally elastically connected with the frame longitudinal bearer 10 under interposition of rubber elements 18—preferably stressed in shear in the vertical direction—by means of an approximately vertical pin 19 secured at the vehicle superstructure.

One pin, for example, one cross pin 20 each anchored at the vehicle longitudinal bearer 10 serves for the rear support of the cross bearer member 11; the rear free end of the corresponding leg portion 15 is universally elastically supported on the cross pin 20 under interposition of a rubber sleeve 21 by means of the rear bearing eye 22. The wheel 23, especially a front wheel of the motor vehicle, is steerably arranged on a wheel carrier 24 (indicated only schematically in FIG. 2) which is pivotally connected, on the one hand, by means of a lower joint 25 with a lower guide member 26 and, on the other hand, by means of an upper joint 27 with an upper guide member 28 indicated only schematically in FIG. 2. The upper guide member 28 is elastically supported directly at the vehicle superstructure, for example, by means of one or two joints 29 (FIG. 2) whereby the joint axes may extend in the vehicle longitudinal direction or transversely or obliquely thereto, either in the horizontal or at an inclined direction. Also, the upper guide member 28 can be replaced by another guide member of any conventional type, for example, in that the wheel carrier 24 or a steering pivot member or the like receiving the wheel carrier 24 is telescopically supported at the vehicle superstructure.

The lower guide member 26 is constructed as triangular guide member with a forward guide arm 30 extending essentially transversely to the driving direction and with a rear guide arm 31 extending obliquely toward the rear, which is rigidly connected with the forward guide arm 30, for example, by welding. A brace or strut 32 may reinforce the guide arms 30 and 31 against one another at their free ends directed toward the vehicle center. The lower guide member 26 is universally elastically supported by means of its forward arm 30 under interposition of a rubber sleeve 33 on a bearing pin 34 extending in the vehicle longitudinal direction or primarily in this direction within the area of the connecting place of the web 14 with the leg portion 15 of the cross bearer member 11 and by means of its rear guide arm 31 under interposition of a rubber sleeve 35 on a bearing pin 36 arranged in the vehicle longitudinal direction or primarily in this direction at a bearing bracket 37 of the cross bearer member 11 within the area of the leg end.

A spring 38 serves for the spring-support of the wheel which is supported, on the one hand, against a spring plate 39 rigidly connected with the guide arm 30 and on the other, against a lug or mount 40 at the vehicle superstructure. A shock absorber (not shown) between the lower guide member 26 and the vehicle superstructure may be supported at the lower guide member, for example, at the location indicated by reference numeral 41.

Possibly also an amortizer or vibration-damper of any conventional construction may be arranged within the area of this bearing support between the cross bearer member 11 and the vehicle superstructure 10, especially with an elastic bearing support 12 yielding primarily in the vertical direction and adjacent the cross web 14 of the cross bearer member 11.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A wheel suspension for vehicles with a vehicle spring means, especially motor vehicles, in which each wheel of two mutually oppositely disposed wheels of a wheel pair are elastically suspended at a vehicle superstructure by guide means with the use of a cross bearer means elastically supported at the vehicle superstructure, characterized in that only the guide means of the two wheels of the wheel pair which are loaded by the vehicle spring means, are elastically supported on the cross bearer means common to both wheels of a wheel pair, independently of the respective other guide means directly supported at the vehicle superstructure in bypassing relationship to the cross bearer means, characterized in that the cross bearer means is constructed substantially U-shaped as a rigid bearer member with leg portions extending generally in the vehicle longitudinal direction, and in that the guide means of the oppositely disposed wheels supported at the cross bearer means include two guide arms each, which are elastically supported, on the one hand, within the area of the beginning of the corresponding leg portion, and on the other, within the area of the end of the corresponding leg portion of the cross bearer means, and characterized in that the cross bearer means is rigid and is elastically supported at the vehicle superstructure within the area of the beginning of the corresponding leg portion and within the area of the end of the corresponding leg portion.

2. A wheel suspension according to claim 1, characterized in that the wheel spring means are supported directly at the vehicle superstructure in bypassing relationship to the cross bearer means.

3. A wheel suspension according to claim 2, characterized in that the leg portions of the substantially U-shaped cross bearer means are directed rearwardly and that a guide means is supported by means of its forward guide arm within the area of the beginning of a respective leg portion while the other, rear guide arm thereof is supported at the end of the respective leg portion.

4. A wheel suspension according to claim 3, characterized in that said forward guide arm is directed essentially transversely to the vehicle driving direction while the rear guide arm is directed rearwardly obliquely to the driving direction.

5. A wheel suspension according to claim 3, characterized in that the forward elastic bearing support means of the cross bearer means on the superstructure is constructed as elastic bearing support arranged essentially vertically while the rear elastic bearing support means of the cross bearer means is constructed as essentially horizontal transversely disposed elastic bearing support.

6. A wheel suspension according to claim 5, characterized in that the vertically arranged bearing support is stressed primarily in shear.

7. A wheel suspension according to claim 5, characterized in that at least one of the amortizer means and vibration-damping means is interconnected between the cross bearer means and the vehicle superstructure at the elastic bearing support means adjacent the cross web of the cross bearer means.

8. A wheel suspension according to claim 7, characterized in that said last-mentioned bearing means is the bearing means principally yielding in the vertical direction and absorbing the main spring forces at the guide means.

9. A wheel suspension according to claim 7, characterized in that the leg portions of the U-shaped cross bearer means are reinforced against the web thereof by inclined struts.

10. A wheel suspension according to claim 9, characterized in that each guide means directly supported at the vehicle superstructure is pivotally supported there at with a pivot axis extending generally in the vehicle longitudinal direction.

11. A wheel suspension according to claim 10, characterized in that said pivot axis extends essentially horizontally.

12. A wheel suspension according to claim 10, characterized in that said pivot axis extends at an inclination.

13. A wheel suspension according to claim 9, characterized in that each of said guide means with two guide arms is a triangularly shaped guide member.

14. A wheel suspension according to claim 13, characterized in that said forward guide arm is directed essentially transversely to the vehicle driving direction while the rear guide arm is directed rearwardly obliquely to the driving direction.

15. A wheel suspension according to claim 14, characterized in that said last-mentioned bearing means is the bearing means principally yielding in the vertical direction and absorbing the main spring forces at the guide means.

16. A wheel suspension according to claim 15, characterized in that the guide means include guide members for steerable wheels.

17. A wheel suspension according to claim 16, characterized in that the guide means for a respective wheel are constituted by superposed guide members.

18. A wheel suspension for vehicles comprising:
vehicle superstructure,
cross bearer means,
elastic mounting elements elastically supporting said cross bearer means at said vehicle superstructure, first guide means including a first guide member connected with a vehicle wheel,
second guide means including a second guide member connected with said vehicle wheel,
and vehicle wheel spring means operatively interposed between said first guide member and said vehicle superstructure,
wherein said first guide member is connected by first bearing means directly to said cross bearer means, and wherein said second guide member is connected by second bearing means directly to said vehicle superstructure in bypassing relationship to the cross bearer means such that the first and second bearing means are isolated with respect to one another by the elastic elements which support said cross bearer means.

19. A wheel suspension according to claim 18, characterized in that the cross bearer means is constructed substantially U-shaped as a rigid bearer member with leg portions extending generally in the vehicle longitudinal direction, and in that the cross bearer means is rigid and is elastically supported at the vehicle superstructure within the area of the beginning of the corresponding leg portion and within the area of the end of the corresponding leg portion.

20. A wheel suspension according to claim 19, characterized in that the leg portions of the substantially U-shaped cross bearer means are directed rearwardly and that a guide means is supported by means of its forward guide arm within the area of the beginning of a respective leg portion while the other, rear guide arm thereof is supported at the end of the respective leg portion.

21. A wheel suspension according to claim 18, characterized in that said wheel is a steerable wheel.

22. A wheel suspension according to claim 21, characterized in that at least one of said guide members is a triangularly shaped guide member having two guide arms pivotally supported at the vehicle superstructure.

23. A wheel suspension according to claim 18, characterized in that the guide members for a respective wheel are constituted by superposed guide members connected to said wheel at different locations.

24. A wheel suspension according to claim 23, characterized in that at least one of said guide members is a triangularly shaped guide member having two guide arms pivotally supported at the vehicle superstructure.

25. A wheel suspension according to claim 24, characterized in that said wheel is a steerable wheel.

26. A wheel suspension according to claim 18, wherein said wheel is supported at said first and second guide members at one lateral side of the vehicle at a respective end of said cross bearer means, and wherein a further wheel is supported at similar guide members at the other opposite end of said cross bearer means.

27. A wheel suspension according to claim 26, characterized in that the wheel spring means are supported directly at the vehicle superstructure in by-passing relationship to the cross bearer means.

28. A wheel suspension according to claim 27, characterized in that the cross bearer means is constructed substantially U-shaped as a rigid bearer member with leg portions extending generally in the vehicle longitudinal direction, and in that the guide means of the oppositely disposed wheels supported at the cross bearer means include two guide arms each, which are elastically supported, on the one hand, within the area of the beginning of the corresponding leg portion, and on the other, within the area of the end of the corresponding leg portion of the cross bearer means.

29. A wheel suspension according to claim 28, characterized in that each of said guide means with two guide arms is a triangularly shaped guide member.

30. A wheel suspension according to claim 28, characterized in that the cross bearer means is rigid and is elastically supported at the vehicle superstructure within the area of the beginning of the corresponding leg portion and within the area of the end of the corresponding leg portion.

31. A wheel suspension according to claim 26, characterized in that the cross bearer means is constructed substantially U-shaped as a rigid bearer member with leg portions extending generally in the vehicle longitudinal direction, and in that the guide means of the oppositely disposed wheels supported at the cross bearer means include two guide arms each, which are elastically supported, on the one hand, within the area of the beginning of the corresponding leg portion, and on the other, within the area of the end of the corresponding leg portion of the cross bearer means.

32. A wheel suspension according to claim 31, characterized in that each of said guide members is a triangularly shaped guide member with two guide arms.

33. A wheel suspension according to claim 31, characterized in that the leg portions of the substantially U-shaped cross bearer means are directed rearwardly and that a guide means is supported by means of its forward guide arm within the area of the beginning of a respective leg portion while the other, rear guide arm thereof is supported at the end of the respective leg portion.

34. A wheel suspension according to claim 33, characterized in that said forward guide arm is directed essentially transversely to the vehicle driving direction while the rear guide arm is directed rearwardly obliquely to the driving direction.

35. A wheel suspension according to claim 18, characterized in that the guide member directly supported at the vehicle superstructure is pivotally supported thereat with a pivot axis extending generally in the vehicle longitudinal direction.

36. A wheel suspension according to claim 35, characterized in that said pivot axis extends essentially horizontally.

37. A wheel suspension according to claim 35, characterized in that said pivot axis extends at an inclination.

38. A wheel suspension according to claim 18, characterized in that at least one of amortizer means and vibration-damping means is interconnected between the cross bearer means and the vehicle superstructure at the elastic mounting elements adjacent the cross web of the cross bearer means.

39. A wheel suspension for vehicles with a vehicle spring means, especially motor vehicles, in which each wheel of two mutually oppositely disposed wheels of a wheel pair are elastically suspended at a vehicle superstructure by guide means with the use of a cross bearer means elastically supported at the vehicle superstructure, characterized in that only the guide means of the two wheels of the wheel pair which are loaded by the vehicle spring means, are elastically supported on the cross bearer means common to both wheels of a wheel pair, independently of the respective other guide means directly supported at the vehicle superstructure in by-passing relationship to the cross bearer means, and characterized in that the forward elastic bearing support means of the cross bearer means on the superstructure is constructed as elastic bearing support arranged essentially vertically while the rear elastic bearing support means of the cross bearer means is constructed as essentially horizontal transversely disposed elastic bearing support.

40. A wheel suspension according to claim 39, characterized in that the vertically arranged bearing support is stressed primarily in shear.

41. A wheel suspension for vehicles with a vehicle spring means, especially motor vehicles, in which each wheel of two mutually oppositely disposed wheels of a wheel pair are elastically suspended at a vehicle superstructure by guide means with the use of a cross bearer means elastically supported at the vehicle superstructure, characterized in that only the guide means of the two wheels of the wheel pair which are loaded by the vehicle spring means, are elastically supported on the cross bearer means common to both wheels of a wheel pair, independently of the respective other guide means directly supported at the vehicle superstructure in by-passing relationship to the cross bearer means, and characterized in that the leg portions of the U-shaped cross bearer means are reinforced against the web thereof by inclined struts.

* * * * *